United States Patent

[11] 3,586,286

| [72] | Inventor | Robert A. Pratt |
| | | Harbert, Mich. |
| [21] | Appl. No. | 744,372 |
| [22] | Filed | July 12, 1968 |
| [45] | Patented | June 22, 1971 |
| [73] | Assignee | Clark Equipment Company |

[54] RETRACTABLE LATCH MECHANISM
7 Claims, 8 Drawing Figs.

[52] U.S. Cl. .................................................. 248/361,
105/366
[51] Int. Cl. ................................................. B65j 1/22,
B60p 7/08
[50] Field of Search .......................................... 248/361;
105/366.2, 366.4, 366.6, 366.8

[56] References Cited
UNITED STATES PATENTS

| 3,417,712 | 12/1968 | Pulcrano et al. | 105/366 |
| 3,437,055 | 4/1969 | Willie et al. | 105/366 |
| 3,507,224 | 4/1970 | Sweger | 105/366 |
| 3,159,111 | 12/1964 | Gutridge | 248/361 X |
| 3,317,236 | 5/1967 | Connerat | 248/361 X |
| 3,367,615 | 2/1968 | Turpen | 248/361 |

*Primary Examiner*—Chancellor E. Harris
*Attorneys*—Kenneth C. Witt, John C. Wiessler, Robert H. Johnson and Reginald J. Falkowski

ABSTRACT: A retractable latching mechanism having a body member pivotally mounted on a frame member to pivot between a latching position and a retracted position, a pintle member extending through an opening in the body member and having a latch portion on one end thereof, and a handle connected to the other end of the pintle member.

3,586,286

Patented Jun 22 1971

INVENTOR
ROBERT A. PRATT
BY
Kenneth C. Witt
ATTORNEY 3,586,286

INVENTOR
ROBERT A. PRATT

BY Kenneth C. Witt

ATTORNEY

RETRACTABLE LATCH MECHANISM

CROSS-REFERENCES TO RELATED APPLICATIONS

This invention desirably may be utilized with the container chassis which is disclosed and claimed in copending application Ser. No. 716,285, now U.S. Pat. No. 3,508,762, dated Apr. 28, 1971 which is assigned to the same assignee as the present invention, but it will be understood that the present retractable latch mechanism is not limited to such use.

BACKGROUND OF THE INVENTION

This invention is particularly adaptable for use in latching shipping containers to conveyances such as semitrailer chassis which are adapted to be pulled over the highway or to railroad cars, but it is adaptable for other purposes as well. On vehicles which are constructed to handle shipping containers it is frequently desirable to have a latching mechanism which projects upwardly above the floor of the conveyance only during the time that it is being used to latch a container to the conveyance, and which may be retracted below the surface of such floor at other times so that the latching mechanism will not interfere with the placing of other types of cargo on the conveyance.

In the case of the container chassis of U.S. Pat. No. 3,508,762 mentioned previously, it is desirable to have a retractable latching mechanism for a somewhat different reason. Such container chassis is intended only for carrying containers, however, since it carries different sizes of containers it is desirable under certain circumstances to have some of the latching mechanisms retractable in order to permit the opening of container doors over the bolsters which carry such latching mechanisms, without interference, and reference is made specifically to mechanisms 48 of the said U.S. Pat. No. 3,508,762 for an example.

SUMMARY OF THE INVENTION

In carrying out my invention in one preferred form thereof, I provide a retractable latching mechanism which includes a frame or bolster member and a body member pivotally mounted on the frame or bolster member to pivot between a latching position and a retracted position. The body member has an opening through it, and a pintle member extends through the opening and has a latch portion on one end. At the other end of the pintle a handle is connected, which handle is utilized both for retracting the mechanism and for operating it between the unlatched and latched positions.

DESCRIPTION OF THE PREFERRED EMBODIMENT

Figure 1:
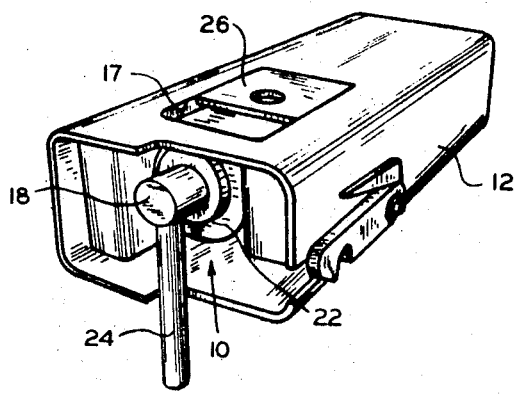
FIG. 1 shows a latching mechanism in accordance with this invention in the retracted position.

In the drawing the retractable latch mechanism of this invention is indicated generally by the numeral 10. As shown the mechanism 10 is mounted upon and partially within a bolster member indicated by the numeral 12. However, it will be understood from the previous explanation that this invention is not limited to use with such a bolster member. The retractable latch mechanism may be mounted on any suitable frame or other structural member, and reference to "frame" in some of the claims is intended to cover any such structural member.

Figure 2:
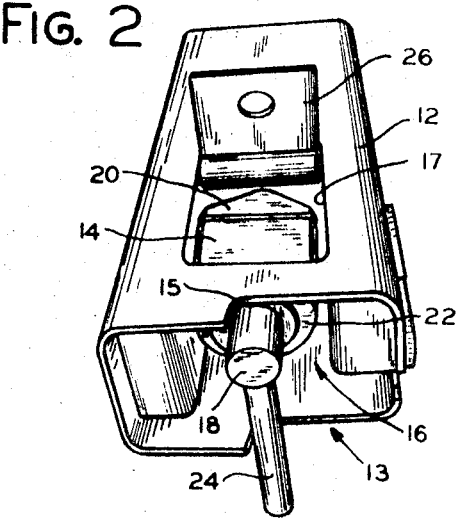
FIG. 2 shows the initial preparation for moving such latching mechanism to the operating position.
Figure 3:
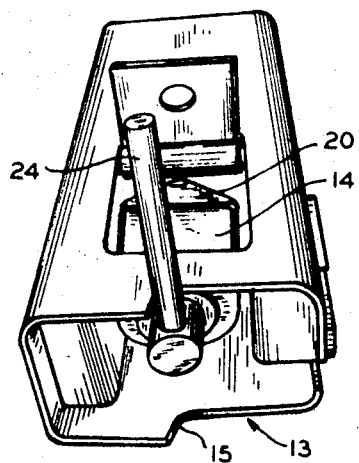
FIG. 3 shows further preparation for movement of the latching mechanism to the operating position.
Figure 4:
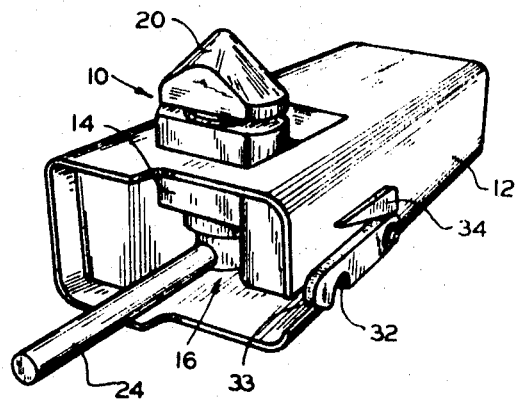
FIG. 4 shows the latching mechanism moved to the operating position.
Figure 5:
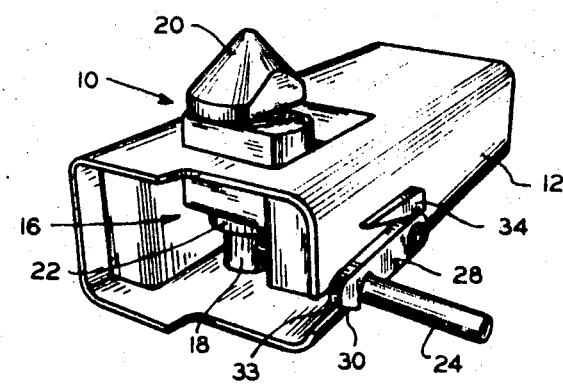
FIG. 5 shows the latching mechanism in the latched position.

The parts of the latch mechanism are perhaps most readily apparent in FIG. 4 of the drawing which shows the latch mechanism in the upright position ready for operation to latch a container (not shown) to the bolster 12. The latch mechanism includes a body member 14 which is pivotally mounted on the bolster 12 in a manner described in greater detail hereinafter, to pivot between a horizontally disposed retracted position as shown in FIGS. 1, 2, and 3 and an upright operative position as shown in FIGS. 4 and 5.

The body member 14 has a circular opening 18$a$ therethrough (see FIG. 6) in which is located a portion of a pintle member which is indicated generally by the numeral 16. The pintle member 16 includes a rod 18 which extends through the opening in body member 14, and a latch portion 20 secured at one end of the rod, the upper end as illustrated in FIGS. 4—7 inclusive. Below the body member 14 a collar 22 is secured to the rod 18 to hold the pintle member in place with respect to the body member. A handle 24 extends into an opening in rod 18 and is secured to the rod.

Referring to FIG. 1 of the drawing, the latch mechanism 10 is shown in the retracted position, and the opening through which it may be moved to the operative position is partially covered by a cover plate 26. Cover plate 26 is hinged to bolster 12 and the first step in moving the latch mechanism from the retracted position to the operative position is illustrated in FIG. 2 in which the cover plate 26 is shown raised to a vertically disposed position to permit the latch mechanism to be pivoted. Next the handle 24 is rotated counterclockwise 180° from the position of FIG. 2 to the position of FIG. 3, the end of the bolster 12 being provided with a cutout portion 13 which permits such movement. The cutout portion 13 affords a pair of shoulder portions 15 along the left of the cutout portion, both top and bottom, and the shoulder portions 15 provide stops for the handle 24 so that it is not moved beyond the vertical either downwardly or upwardly. Such rotation of handle 24 rotates latch portion 20 of the pintle 180° also.

Next the handle 24 is pulled from the position of FIG. 3 downwardly to the position of FIG. 4 which moves the body member and pintle member of the latching mechanism to the upright operative position shown in FIG. 4. The cover plate 26 can then be closed again to close the portion of the opening 17 in the bolster which is not occupied by the body portion 14.

From the position of FIG. 4, the handle 24 is moved through an angle of approximately 90° horizontally to move the latch portion 20 to the latching position, the side of the bolster 12 having a cutout portion or slot 33 which permits this. It will be understood by those skilled in the art that in this position the latch portion 20 may be utilized to secure a container on the bolster 12. If further information is desired as to the manner in which such latching is accomplished, reference may be had to U.S. Pat. No. 2,963,310, particularly FIGS. 8 through 11 of such patent, which illustrate the operation of a similar latch portion which forms a part of a nonretractable latch mechanism.

The handle 24 may be held in the position of FIG. 5 by a latch member or keeper 28 which is pivotally connected to the side of bolster 12. The keeper 28 has a slanted surface 30 which causes the keeper automatically to raise, by cam action, as the handle 24 is moved into the position of FIG. 5, and a slot 32 within which the handle 24 is held after keeper 28 returns by gravity to its initial position. A projection 34 on the side of bolster 12 holds the keeper 28 in proper position for the operation described.

It will be appreciated that the latch mechanism may be returned from the latched position to the unlatched position and then to the retracted position by following the reverse of the procedure heretofore described. To initiate such reverse procedure it is necessary only to manually lift the keeper 28 which permits the handle 24 to be rotated from the position of FIG. 5 out to the position of FIG. 4 again. Then the cover plate 26 is once again raised after which the handle 24 can be moved upwardly to the position of FIG. 3, and thereafter the mechanism moved to the positions of FIG. 2 and FIG. 1 in sequence.

Figure 6:
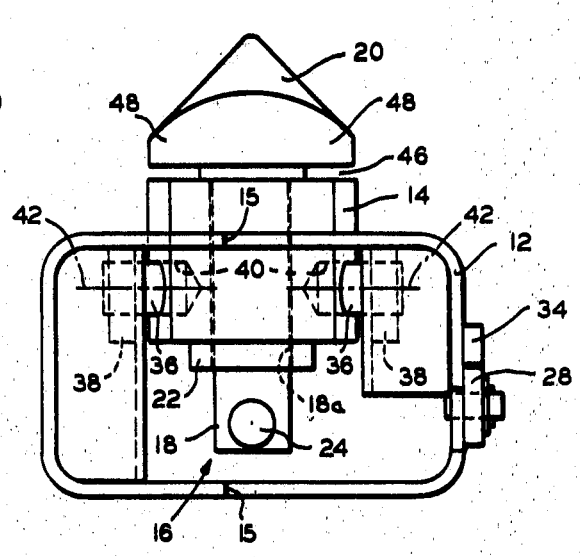
FIG. 6 is an end view of the structure in the same condition as in FIG. 4.
Figure 7:
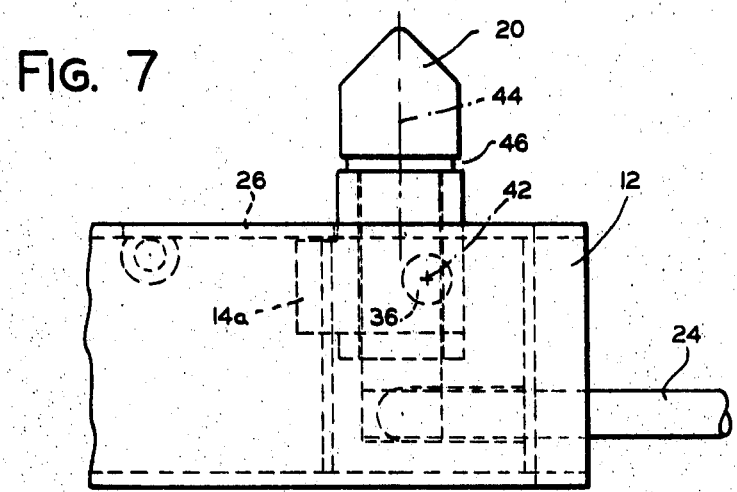
FIG. 7 is a partial side view of the structure in the same condition.
Figure 8:
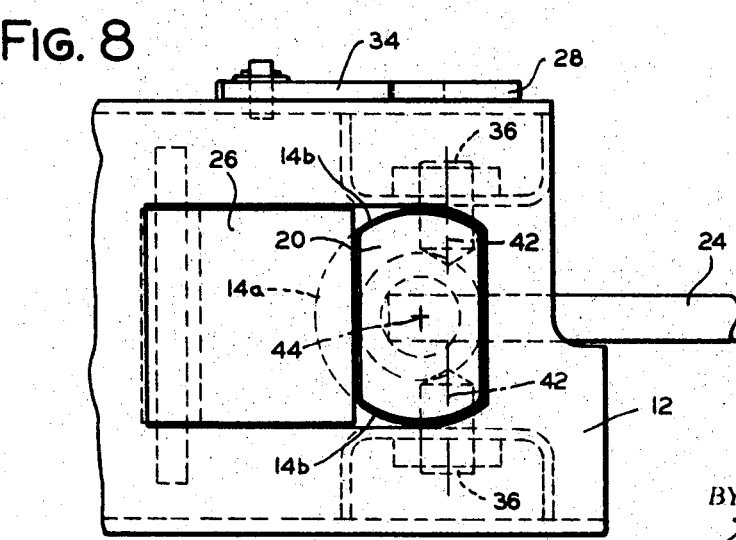
FIG. 8 is a partial top plan view of the structure in the same condition.

More details of one preferred construction of this retractable latch mechanism are illustrated in FIGS. 6, 7, and 8 of the drawing. As shown in these figures, the body portion 14 is pivotally mounted on the bolster 12 trunnion fashion by means of a pair of short cylindrical pivot pins 36 which are secured in a pair of bracket portions 38 forming part of the bolster 12. The pins 36 project into openings 40 in the body member, being journaled in such openings to permit the body member 14 to pivot with respect to the pins 36. It will be observed from these figures, particularly FIGS. 7 and 8, that the axis 42 of these pivot pins is offset from the axis 44 of the pintle member 16, the offset being toward the outer end of the bolster member. Such arrangement puts the center of gravity of the body member and pintle member inwardly of the axis 42 and tends to cause the latch mechanism to return to the retracted position when permitted by the position of the pintle member and handle 24.

As may be seen in FIGS. 7 and 8, the body member 14 has a rearwardly projecting portion 14a upon which the cover plate 26 rests when the latch mechanism is in the operative position and the cover plate 26 is down. Looking at the top plan view of FIG. 8, it will be observed that the body portion 14 has curved surfaces 14b at the sides, where it is pivotally connected to the bolster 12. The latch portion 20 of the pintle member is slightly smaller in both length and width than the body portion 14, as shown in FIG. 8, to facilitate the entry of the latch portion 20 into the mating receptacle of a container. The pintle member also is provided with a recessed portion 46 between body member 14 and latch portion 20 to facilitate the turning of the pintle and to permit the outwardly extending portions 48 (see FIG. 6) of latch portion 20 to extend outwardly over the member to which the latch mechanism is to be secured in the latched position. It will be appreciated that the latch or head portion 20 is secured to the rod 18 and turns therewith with respect to the body member 14 as the mechanism is moved from the unlatched to the latched position.

While I have described and illustrated herein a preferred embodiment of my invention in accordance with the statutes, it will be appreciated that modifications may be made. Therefore, it should be understood that I intend to cover by the appended claims all such modifications which fall within the true spirit and scope of my invention.

I claim:

1. A retractable latch mechanism comprising a frame member, a body member pivotally mounted on the said frame member to pivot between an operative position and a retracted position, the said body member having an opening therethrough, a pintle member extending through the said opening and having a latch portion on one end thereof, and a laterally extending handle rigidly connected near the other end of the said pintle member for pivoting the said pintle member about its axis, the said handle being arranged when in one pivotal position of the pintle for pivoting the body member between the said operative position and the said retracted position.

2. A retractable latch mechanism as specified in claim 1 in which the said axis of the pintle member is offset from the axis about which the said body member is pivotally mounted on the said frame member.

3. A retractable latch mechanism as specified in claim 1 in which the said frame member comprises a bolster and wherein the said handle, extends out the end of the said bolster in all positions of the latch mechanism except the latched position.

4. A latch mechanism as specified in claim 3 in which the said handle, extends out the side of the said bolster member in the said latched position and a keeper secured to the bolster is provided for holding the said handle, in such position.

5. A latch mechanism comprising an elongated bolster having an opening in the upper surface thereof, a body member pivotally mounted about a transverse axis to pivot between a horizontally disposed retracted position within the said bolster and an upright operative position projecting partially above the said bolster through the said opening therein, the said body member having an opening therethrough, a pintle member extending through the said opening in the body member and having a latch portion on the end thereof which projects above the said bolster in the operative position, the other end of the said pintle member being adjacent the end of the said bolster when the said body member is in the retracted position, and a laterally extending handle rigidly connected near the said other end of the said pintle member for pivoting the pintle member about between its axis, the said handle being arranged when in one pivotal position of the said pintle for pivoting the said body member between its retracted position and its upright position.

6. A retractable latch mechanism as specified in claim 5 in which the said handle is straight and is connected at right angles to the said pintle, the end of the said bolster having a cutout portion which permits the said handle to be moved through an angle of approximately 180° when the said body portion is in the retracted position.

7. A retractable latch mechanism as specified in claim 6 in which the said bolster member has an additional cutout portion on one side thereof which permits the said handle to be pivoted horizontally approximately 90° from an outwardly projecting position to a transverse position when the said body portion is in its upright position, and a keeper on the said bolster for retaining the said handle in the last-mentioned position.

UNITED STATES PATENT OFFICE
CERTIFICATE OF CORRECTION

Patent No. 3,586,286              Dated June 22, 1971

Inventor(s) Robert A. Pratt

It is certified that error appears in the above-identified patent and that said Letters Patent are hereby corrected as shown below:

Column 4, line 35, delete the word "between".

Signed and sealed this 16th day of November 1971.

(SEAL)
Attest:

EDWARD M. FLETCHER, JR.          ROBERT GOTTSCHALK
Attesting Officer                Acting Commissioner of Patents